US012537907B2

(12) United States Patent
Calligaro et al.

(10) Patent No.: US 12,537,907 B2
(45) Date of Patent: Jan. 27, 2026

(54) METHOD FOR FORMING PANORAMIC IMAGES AND RELATED APPARATUS

(71) Applicant: SEESAFE INNOVATION SRL, Saronno (IT)

(72) Inventors: Marta Calligaro, Gallarate (IT); Marco Compagnoni, Valfurva (IT); Marco Marcon, Bollate (IT)

(73) Assignee: SEESAFE INNOVATION SRL, Saronno (IT)

( * ) Notice: Subject to any disclaimer, the term of this patent is extended or adjusted under 35 U.S.C. 154(b) by 133 days.

(21) Appl. No.: 18/258,442

(22) PCT Filed: Dec. 20, 2021

(86) PCT No.: PCT/IB2021/062038
§ 371 (c)(1),
(2) Date: Jun. 20, 2023

(87) PCT Pub. No.: WO2022/137090
PCT Pub. Date: Jun. 30, 2022

(65) Prior Publication Data
US 2024/0305739 A1    Sep. 12, 2024

(30) Foreign Application Priority Data

Dec. 21, 2020   (IT) .................. 102020000031607

(51) Int. Cl.
*G06T 7/55*          (2017.01)
*G01S 17/86*         (2020.01)
(Continued)

(52) U.S. Cl.
CPC .......... *H04N 5/2624* (2013.01); *G01S 17/86* (2020.01); *G01S 17/894* (2020.01); *G06T 7/55* (2017.01);
(Continued)

(58) Field of Classification Search
CPC .......... H04N 5/2624; G06T 7/55; G06T 7/74; G01S 17/86; G01S 17/894
(Continued)

(56) References Cited

U.S. PATENT DOCUMENTS

2018/0329066 A1   11/2018   Pacala

OTHER PUBLICATIONS

Hao Ma et al: "A Method of Generating Measurable Panoramic Image for Indoor Mobile Measurement System", arxiv.org, Cornell University Library, 201 Olin Library Cornell University Ithaca, NY 14853, pp. 1-15, Oct. 27, 2020.

*Primary Examiner* — Nguyen T Truong
(74) *Attorney, Agent, or Firm* — FisherBroyles, LLP; Roger L. Browdy; Ronni S. Jillions

(57) ABSTRACT

A method is described for forming a panoramic image (I); the method comprising: receiving (B1) a plurality of images (I1, I2 . . . Ir) of an environment from a corresponding plurality of cameras (C1, C2 . . . Cr) at a given time instant (t), receiving (B1) data on the position of the points relative to the physical objects of said environment shot by said plurality of cameras by at least one depth sensor (L1, L2 . . . Lf) at said given time instant, processing (B2) data obtained from the at least one depth sensor to construct the distance of all the objects contained inside said environment by a virtual camera (C), obtaining a three-dimensional map of the positions of the points relative to the physical objects of said environment, combining (B3) said three-dimensional map with the information contained in a previously made and stored lookup table (LUT) and wherein a cell of said lookup table (LUT) is allocated to each pixel of the plurality of pixels which compose said panoramic image observed by said virtual camera (C), said cell storing the information on the pixels (Pi) of said plurality of images corresponding to the position of the single point (P) of the three-dimensional map and information on the weights (Wi) associated with
(Continued)

said corresponding pixels of said plurality of images, linearly combining (B4) said pixels of said plurality of images as a function of their weight obtaining said panoramic image.

10 Claims, 4 Drawing Sheets

(51) Int. Cl.
    *G01S 17/894*     (2020.01)
    *G06T 7/73*     (2017.01)
    *H04N 5/262*     (2006.01)

(52) U.S. Cl.
    CPC ...... *G06T 7/74* (2017.01); *G06T 2207/10028* (2013.01); *G06T 2207/20212* (2013.01)

(58) Field of Classification Search
    USPC .......................................................... 348/36
    See application file for complete search history.

METHOD FOR FORMING PANORAMIC IMAGES AND RELATED APPARATUS

The present invention relates to a method for forming panoramic images and related apparatus. In particular, the present invention relates to the formation of real-time panoramic images using the stitching procedure.

The stitching procedure or technique allows creating a panoramic image starting from a set of partially overlapping images.

In general, the standard stitching procedure consists of several steps including estimating the homographies across various images starting from feature matching (image registration).

The step of image registration depends on the position in the three-dimensional space of the objects appearing in the images, which normally is not known and cannot be estimated in real-time starting from the images themselves. Consequently, in traditional approaches to the problem, an assumption concerning the location of such objects, i.e., their distance from the cameras, is made a priori (e.g., assuming that the points are at a very large distance, ideally at infinity). If the assumption reveals to be wrong, a splitting effect of the same objects captured by different cameras (parallax errors), which negatively impacts the visual quality of the final panoramic image, can be observed in the panoramic image.

The formation of real-time panoramic images is often used in automotive advanced driver-assistance systems or ADAS to reduce human errors, in particular in pedestrian detection systems or motor vehicle parking assistance systems.

US 2020/195846 describes a method for displaying a panoramic image on a single display screen. The method of the aforesaid patent is based on a lookup table (LUT) for performing real-time image stitching. The observation point is arbitrary and the possibility of performing stitching is described assuming that the objects in the images are on a given surface in space. The use of the LUT is suggested to speed up the execution of stitching starting from images only, assuming that the three-dimensional position of the framed objects is known a priori.

In view of the prior art, it is the object of the present invention to provide a method for forming panoramic images which is more accurate than the known methods.

Indeed, in a scenario in which objects are framed at different distances, using information about their position in space allows improving the formation of panoramic images.

According to the present invention, such a purpose is achieved by means of a method for forming a panoramic image, said method comprising:
  Receiving a plurality of images of an environment from a corresponding plurality of cameras at a given time instant,
  Receiving data on the position of the points relative to the physical objects of said environment shot by said plurality of cameras by at least one depth sensor at said given time instant,
  Processing data obtained from the at least one depth sensor to reconstruct the distance of all the objects contained inside said environment by a virtual camera, obtaining a three-dimensional map of the positions of the points relative to the physical objects of said environment,
  Combining said three-dimensional map with the information contained in a previously made and stored lookup table (LUT) and wherein a cell of said lookup table is allocated to each pixel of the plurality of pixels which compose said panoramic image observed by said virtual camera, said cell storing the information on the pixels of said plurality of images corresponding to the position of the single point of the three-dimensional map and information on the weights associated with said corresponding pixels of said plurality of images,
  linearly combining said pixels of said plurality of images as a function of their weight obtaining said panoramic image.

By means of the present invention, it is possible to provide a method of making a panoramic image which is more accurate than the known methods. The method includes the use of a plurality of mutually calibrated and synchronized cameras and one or more depth/distance sensors calibrated and synchronized with the cameras.

Preferably, hardware-level methods may be used to acquire the data from the mutually synchronized sensors with high accuracy. There are two possible approaches. The first consists in configuring one of the devices as "master", which in addition to providing data is responsible for synchronizing the acquisitions with the other sensors (which in this case are considered "slaves"); alternatively, if no sensor has this ability, an external instrument can be used as a triggering device, such as a function generator, with the sole task of generating a signal which allows the synchronization of the acquisitions from all sensors.

The ordinary stitching procedures based on estimating the homography across acquired images are too onerous for computation and thus not adapted for real-time operation. Instead, the method according to the invention for accomplishing real-time stitching is based on defining a data structure called a lookup table (LUT). It contains all the information needed for the procedure which can be pre-calculated relative to the actual process of creating the panoramic image.

Therefore, compared to the prior art, the method according to the invention stands out because it explicitly integrates depth/distance and image data to achieve a significant improvement in the stitching procedure.

The features and the advantages of the present invention will be apparent from the following detailed description of a practical embodiment thereof, illustrated by way of non-limiting example in the accompanying drawings, in which.

Figure 2:
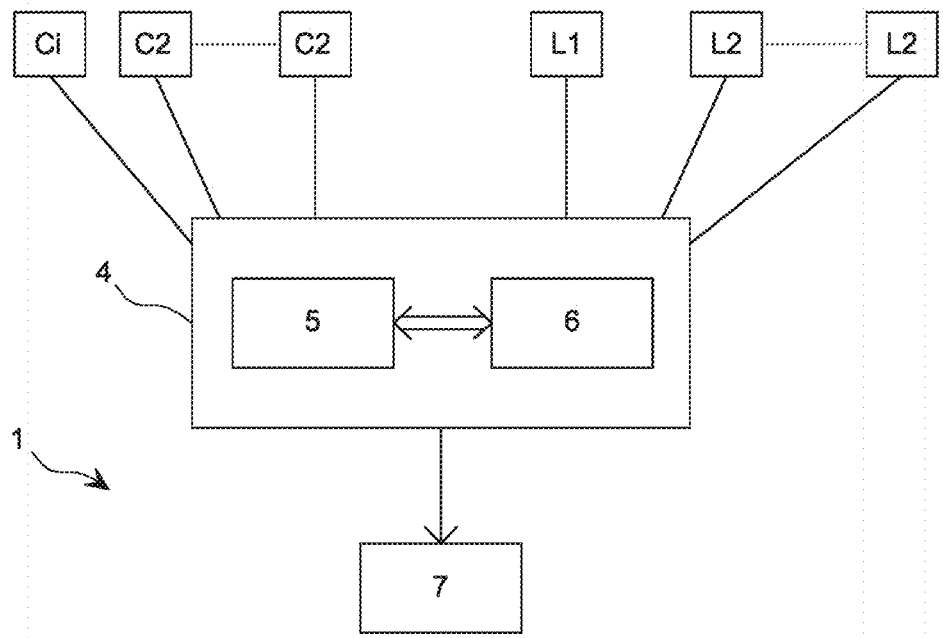
FIG. 2 is a diagram of an apparatus adapted to implement the method in FIG. 1.

FIG. 2 shows an apparatus 1 for forming a panoramic image according to the present invention. Said apparatus 1 comprises a plurality of cameras C1, C2 . . . Cr, at least one depth or distance sensor but preferably a plurality of depth or distance sensors L1, L2 ... Lf adapted to determine the position of objects imaged by the plurality of cameras C1, C2 ... Cr, and a data processing device 4 comprising a microprocessor 5 and a memory 6 in which a software is installed, the functions of which implement the steps of the method according to the invention. The sensors of the plurality of depth or distance sensors L1, L2 ... Lf are fixed. The apparatus 1 further comprises a display 7 for viewing the formed panoramic image I. The apparatus 1 may be installed in a vehicle, in which case it may serve for parking the vehicle, or in a boat, in which case it may serve for mooring the boat.

Figure 1:
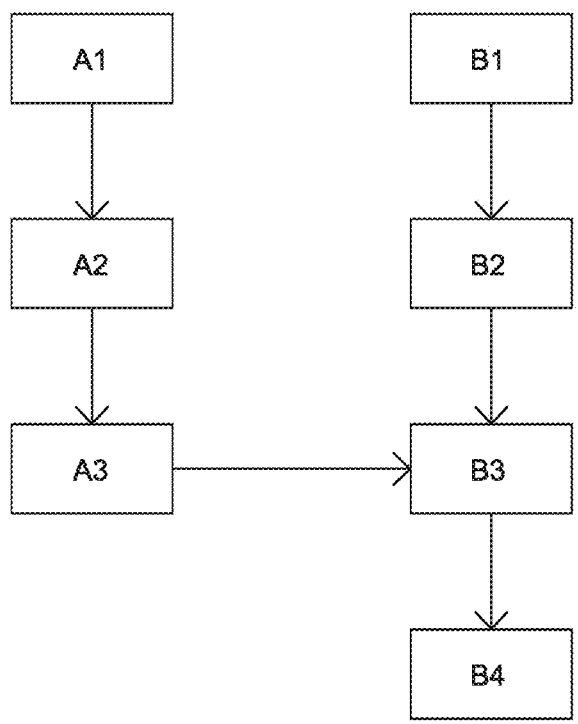
FIG. 1 shows a diagram of the steps of the method for forming panoramic images according to the present invention.

The method or process for forming a panoramic image according to the invention comprises two parts, as shown in FIG. 1.

The steps in the first part are normally performed once by apparatus 1 unless the observation point of the apparatus is changed. In the first part, apparatus 1 is calibrated and the lookup table definition operations are performed. The steps of the second part of the method according to the invention are performed in real-time by the apparatus 1 and consist of reading data from the sensors L1, L2 ... Lf and combining them with the data previously calculated in the first part and present in the lookup table LUT to create the panoramic image I.

The first part of the method according to the invention comprises a first step A1 for calibrating the plurality of cameras C1, C2 ... Cr; the camera calibration procedure is known in the prior art. From a mathematical point of view, a camera is characterized by a collection of intrinsic parameters (focal length, optical center position, distortion parameters) which allows calculating the projection of a three-dimensional point onto the photographic image;

a collection of extrinsic parameters (Rotation and Translation) which allow determining the position of the camera relative to a global reference system. Calibrating a camera system means determining the intrinsic and extrinsic parameters of each camera. The calibration method which is implemented in step A1 is described in Z. Zhang. "A Flexible New Technique for Camera Calibration" IEEE Transactions on Pattern Analysis and Machine Intelligence, Vol. 22, No. 11, 2000, pp. 1330-1334 involves the use of a reference object of a known size, such as a checkerboard painted on a rigid support. The procedure is as follows:

multiple images of the checkerboard in different poses are acquired keeping the cameras in fixed positions;

the vertices of the checkerboard square in each image are identified through image processing algorithms.

Successively, a step A2 of calibrating the cameras C1, C2 ... Cr with the sensors L1, L2 ... Lf is performed.

The calibration between a camera and a LIDAR sensor consists in estimating the roto-translation between the reference systems of the two apparatuses. The calibration method between camera and LIDAR which is implemented in step A2, in the case of two-dimensional LIDAR, is described in Zhang, Qilong, and Robert Pless. "Extrinsic calibration of a camera and laser range finder (improves camera calibration)." 2004 IEEE/RSJ International Conference on Intelligent Robots and Systems (IROS)(IEEE Cat. No. 04CH37566). Vol. 3. IEEE, 2004, and is based on the use of a painted checkerboard on a rigid support. The main steps of the method are:

multiple images of the checkerboard in different poses are acquired keeping the camera and LIDAR positions fixed. Simultaneously, the depth sensor is used to obtain the coordinates of points belonging to the same plane of the checkerboard;

the vertices of the checkerboard square in each image are identified through image processing algorithms. The checkerboard positions are estimated in the camera reference system based on the knowledge of the metric information of the checkerboard and the intrinsic parameters of the camera (previously calculated in the camera calibration procedure);

the data on points measured by the LIDAR are used to estimate the position of the checkerboard plane (or a line belonging to it, in the case of a two-dimensional sensor) in the LIDAR reference system;

the rigid transformation between the reference systems of the two apparatuses is estimated by combining the previous information.

Figure 3:
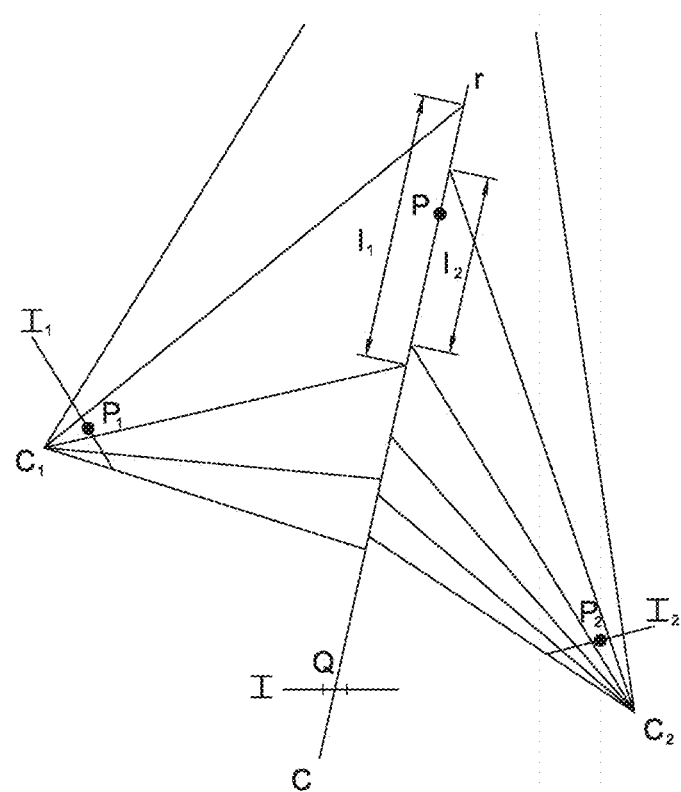
FIG. 3 is a diagram of the ray tracking for forming the panoramic image.

Successively, there is the third step A3 for determining the lookup table LUT. The LUT must contain the information needed to obtain the panoramic image I. Such an image corresponds to the view of the environment which would be obtained from the virtual camera C, using an appropriate space reference system (e.g., cylindrical or spherical with origin C). Once such a system is chosen, each pixel Q of the image I, which we assume is composed of a matrix of pixels P×D, corresponds to an optical ray r exiting from the virtual camera C and passing through Q. The pixel Q corresponds to the image of the physical object contained in the environment and which first intercepts the ray r. With the method for forming panoramic images according to the present invention, the position of objects in space is not assumed a priori and is instead estimated in real-time starting from the depth data. Therefore, the LUT must contain the information for forming the pixels Q for any position P of the object along the radius r. To this end, the LUT is implemented as follows:

a cell of the LUT is allocated to each pixel Q of the panoramic image I;

the cell corresponding to the pixel Q contains information about each segment li of the ray r which is projected onto a single pixel Pi of the image Ii, for each physical camera Ci with i=1, ... , r, i.e. the portion ti of the ray r seen by the camera Ci with i=1, ... , r. More specifically, the cell contains the information about the position of the initial point of the segment li (FIG. 3);

for each segment li the cell corresponding to Q contains the weight to be associated with the pixel Pi of the image Ii for i=1, ... , r, which will be used in the definition of the linear combination of the pixels of the individual images which determines the color of the pixel Q in the panoramic image. For the choice of weights, the cell corresponding to the pixel Q contains a vector of weights to be assigned to the pixels of each image Ii for i=1, ... , r. Such weights will be used in defining the linear combination of Pi pixels which determines the color of the pixel Q in the panoramic image. The determination of weights is not unambiguous. A common choice is to make more value of pixels closer to the central region of an image because these are assumed to be subject to less distortion than the pixels in lateral positions; any radial or other distortions estimated during calibration can still be incorporated into the LUT.

The information about segments ti is determined as follows.

Figure 4:
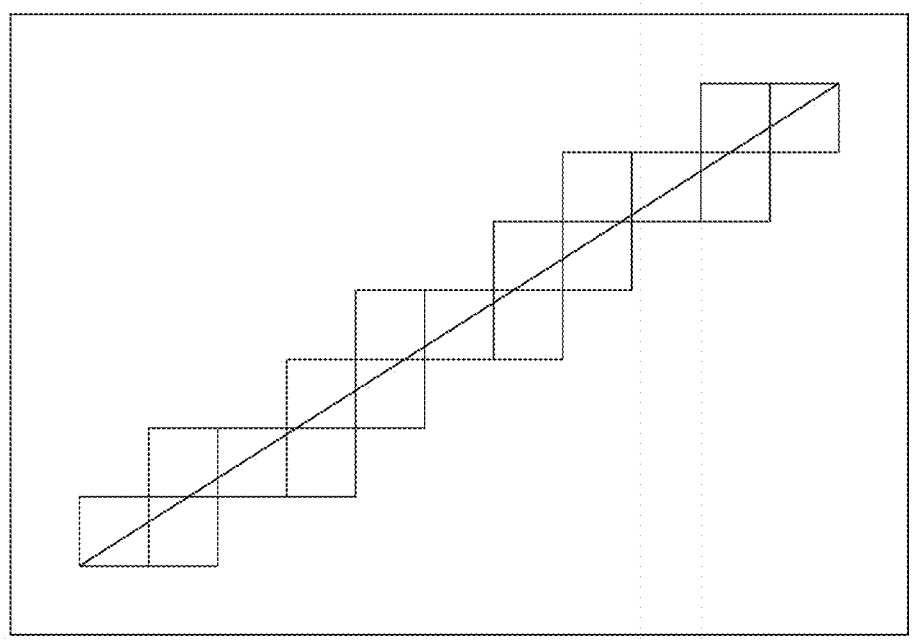
FIG. 4 is a diagram of the projection of ray r onto the image plane of camera C1.

We will consider the projection of the ray r onto the image plane I1 of camera C1 (FIG. 4). It determines a straight segment l1 (assuming compensated for any distortions of the image) in the image I1. Such a segment intersects the edge of some given pixels of the image in a sequence of points, the coordinates of which can be mathematically determined in the image I1. The back-projection of these points onto the ray r then determines the position of the extremes of the segment l1 associated with individual pixels in the image I1. Similar considerations apply to segments associated with any other camera in the system. (In other words, for each ray r outputting from the pixel Q of image I, the projections ti of the ray r on the images I1 . . . Ir of the corresponding cameras C1, C2 . . . Cr are identified and thus the pixels Pi of each image I1 . . . Ir which are associated with the ray r; said pixels Pi and their weights Wi are the information contained in each cell of the LUT).

The second part of the method according to the invention comprises a first step B1 for acquiring images of an environment at a given instant t from the plurality of cameras C1, C2 . . . Cr and data from sensors L1, L2 . . . Lf relating to objects contained in said environment again at instant t, a subsequent step B2 for processing of the data from the depth sensors and a third step B3 for linearly combining data obtained from step B2 with the information contained in the LUT and a step B4 for forming the panoramic image I.

Figure 5:
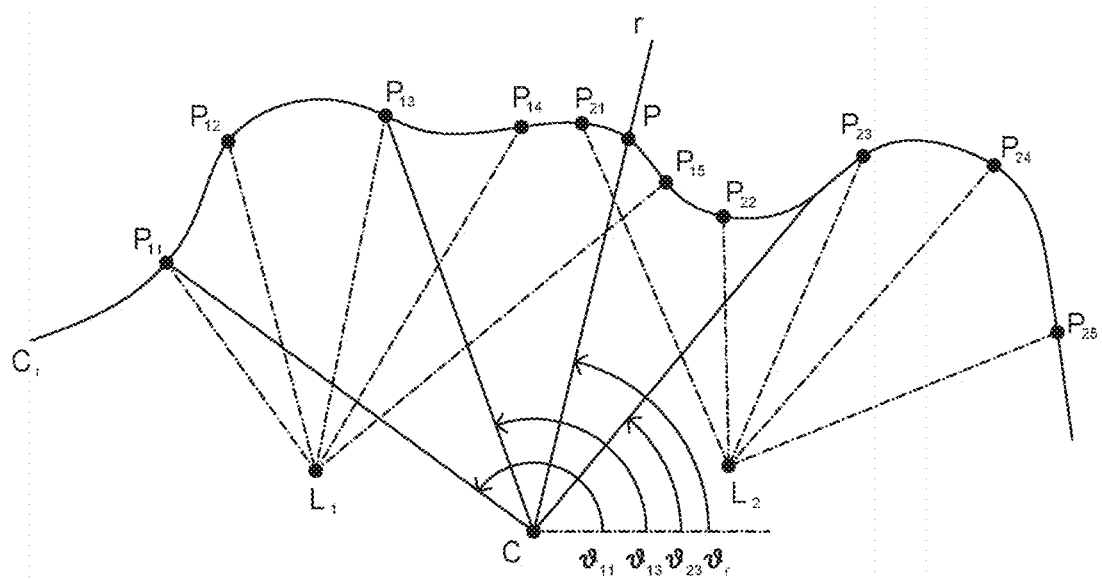
FIG. 5 is a diagram of the formation of the angular coordinates of the sampling points of the intersection curve of the surface of the physical objects observed by the virtual camera with the physical plane identified by the laser rays coming from the LIDAR and the virtual camera.
Figure 6:
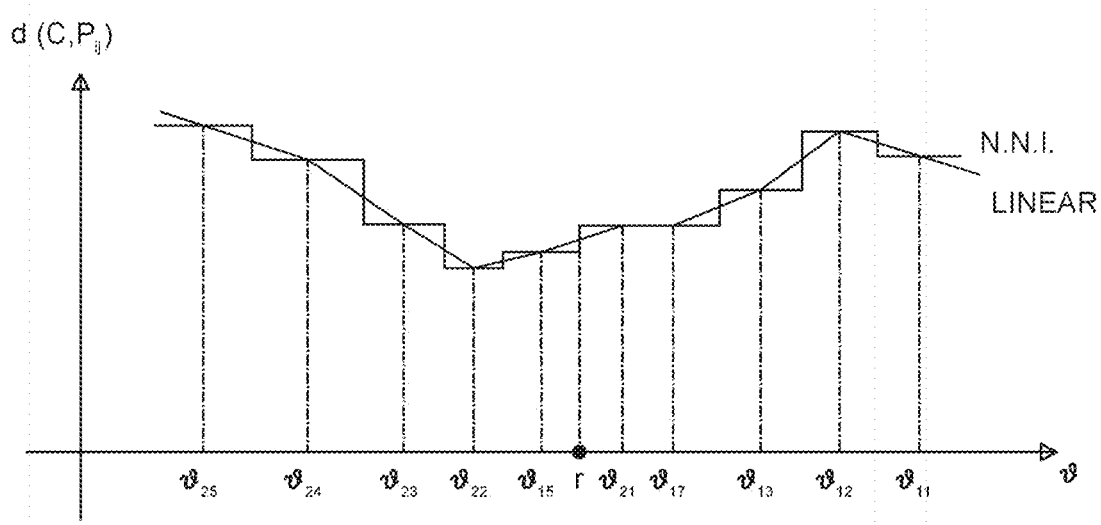
FIG. 6 shows interpolation defined by a piecewise constant and interpolation defined by a piecewise linear function.

If the depth sensors L1, L2 . . . Lf are two-dimensional LIDAR sensors and if the apparatus 1 comprises only two two-dimensional or 2D LIDAR sensors L1 and L2 and a virtual camera C, as shown in FIG. 5, it is assumed that:
the laser blades of sensors L1 and L2 are contained on the same physical plane Π, on which the virtual camera C is also located;
physical objects observed by camera C determine a surface S in space, the intersection of which with the plane Π defines a curve Cr. The points Pij identified by sensors L1 and L2 constitute a sampling of this curve.

For the formation of the panoramic image it is required to estimate the position of each point intersection Pij of the generic optical ray r outputting from the virtual camera C and the surface S. In general, this requires:
the interpolation of points Pij with a curve C' contained in Π, which approximates the physical curve Cr;
the immersion of the curve C' into a surface S' which approximates the physical surface S.

The definition of the interpolation and immersion is not unique because it depends on the assumptions made about the surface S, the precision desired to be achieved, and the computational performance which is required. A possible strategy for the interpolation is shown in FIG. 5:
by virtue of the LIDAR calibration, the positions of the points Pij in the reference system of the virtual camera C can be obtained. In particular, the angular coordinates θij corresponding to such points relative to a fixed reference direction, can be calculated;
the function is interpolated into a variable d(C,P)(θ) starting from the distances d(C, Pij)(θij) of the points sampled by the virtual camera C. The figure shows the interpolation defined by a constant stroke function (Nearest Neighbor Interpolation) and the interpolation defined by a linear stroke function (Piecewise Linear Interpolation). Other possible choices are, for example, the bicubic and spline interpolation;
from the knowledge of d(C,P)(θ) it is possible to derive the curve C' and thus estimate the position of each point P in the plane Π.

The immersion of C' into the surface S' is instead obtainable after choosing appropriate assumptions about the distribution of physical objects in space. For example, it can be assumed that the significant objects are located at the height of the plane of lasers emitted by LIDAR sensors L1, L2 . . . Lf, and which outside H the reconstruction of the distances from C obtained in the plane continues to hold. In such a case, S' is the generalized cylinder having as directrix the curve C' and as generators the straight lines perpendicular to Π. Other choices are still possible (e.g. spherical surface or bowl surface).

The intersection of the optical rays r with S' determines the position of the points Pij, and in particular their location along the optical ray itself, i.e., the three-dimensional map of the positions of the points relative to the physical objects in said environment. Finally, this information allows the definition of the panoramic image I through the use of the LUT. The whole procedure of interpolation, immersion, distance estimation and formation of the panoramic image can be carried out in real-time.

The procedure described in detail in the two-dimensional case is simplified in the presence of three-dimensional depth sensors. In this situation, the surface S' can be directly obtained by interpolation of the points obtained from the 3D LIDARs (e.g. piecewise constant, triangulation, Non-Uniform Rational Basis-Splines but preferably by triangulation interpolation) without implementing the previous steps described in case of using two-dimensional LIDARs; the intersection of the optical rays r with the surface S' determines the position of the points Pij, and in particular their location along the optical ray itself, i.e., the three-dimensional map of the positions of the points relative to the physical objects in said environment.

The information about the position of point P along the optical ray r allow defining the value of the corresponding pixel Q of the panoramic image. Indeed, by virtue of the LUT we know:
the pixels Pi corresponding to P in the individual images Ii for i=1, . . . , n;
the weights Wi to be associated with the individual pixels Pi.

Therefore, with the step B2 of interpolation of the data coming from the sensors a three-dimensional map of the points of the environment framed by the cameras and object of the sensors is obtained. Step B3 is a step in which the information about the position of the objects of the environment of said three-dimensional map is combined with the information contained in the previously made and stored lookup table LUT and in which a cell of said lookup table is allocated to each pixel of the plurality of pixels which form the panoramic image. Each cell contains information about pixels of said plurality of images corresponding to the position of a single point of the three-dimensional map and information regarding the weights associated with said corresponding pixels of said plurality of images.

In step B4, the panoramic image is made by linearly combining the pixels of said plurality of images as a function of their weight.

For example, in an RGB image each pixel Pi is associated with a triplet of non-negative integers (PiR,PiG,PiB), corresponding to the components of the different primary colors. So, the color of pixel Q of the panoramic image is defined as:

$$(Qr, Qg, Qb) = \frac{\sum_{i=1}^{n} Wi(PiR, PiG, PiB)}{\sum_{i=1}^{n} Wi}$$

The computational costs of building the LUT are of no interest because the previously described procedure is performed offline.

Instead, it is important to estimate the memory occupied by the LUT, because such a data structure will need to be loaded into the RAM of the apparatus to be used in real-time.

The following system configuration is considered:
the panoramic image has P×D resolution, so there are P×D optical rays;
the images captured by cameras C1, C2 . . . Cr all have M×N resolution;
the system consists of R physical cameras.

The worst case is characterized as follows:
each optical ray r is visible from all cameras, so there are a total number of P×D×R ray projections onto individual images Ii;
the projection of each ray r intersects as many rows and columns as possible in each image, i.e. M+N, thus determining M+N segments on r.

In such a situation the size of the LUT would be:

$$D = PxDxRx(M + N).$$

Each element of the LUT must contain the following information:
the pixel of the image Ii corresponding to segment li (representable by a 32-bit integer);
the starting point of the segment li (representable by a 32-bit float variable);
the weight to be assigned to the pixel (representable with a 32-bit float variable).

The maximum size of a LUT is calculated by way of example in the following configuration:
panoramic image resolution P×D=1920×300;
No cameras R=5;
single image resolution M×N=420×300;
single element LUT size: 12B (3 32-bit variables).

According to formula (1), the overall size of the LUT in bytes is:

$$Dlut=1920\times300\times5\times(420+300)\times12=24.8 \text{ GB}$$

In a typical camera system configuration, an optical ray is projected into one or at most two images, and in such projections, it intersects several pixels, which may even be much smaller than the maximum possible number.

The described method can be integrated with a three-dimensional object shape recognition algorithm. This would allow the detection of obstacles along the optical paths, thus improving the interpolation of pixels and the formation of the panoramic image.

Furthermore, algorithms can be applied to correct some distortions typical in the creation of panoramic images. Indeed, it is known that artifacts can be created, e.g. due to the different brightness of the images, in the overlapping areas of the single images. Techniques, such as blending or gain compensation, are typically used to overcome these problems, they can be integrated into the stitching procedure.

Figure 7:
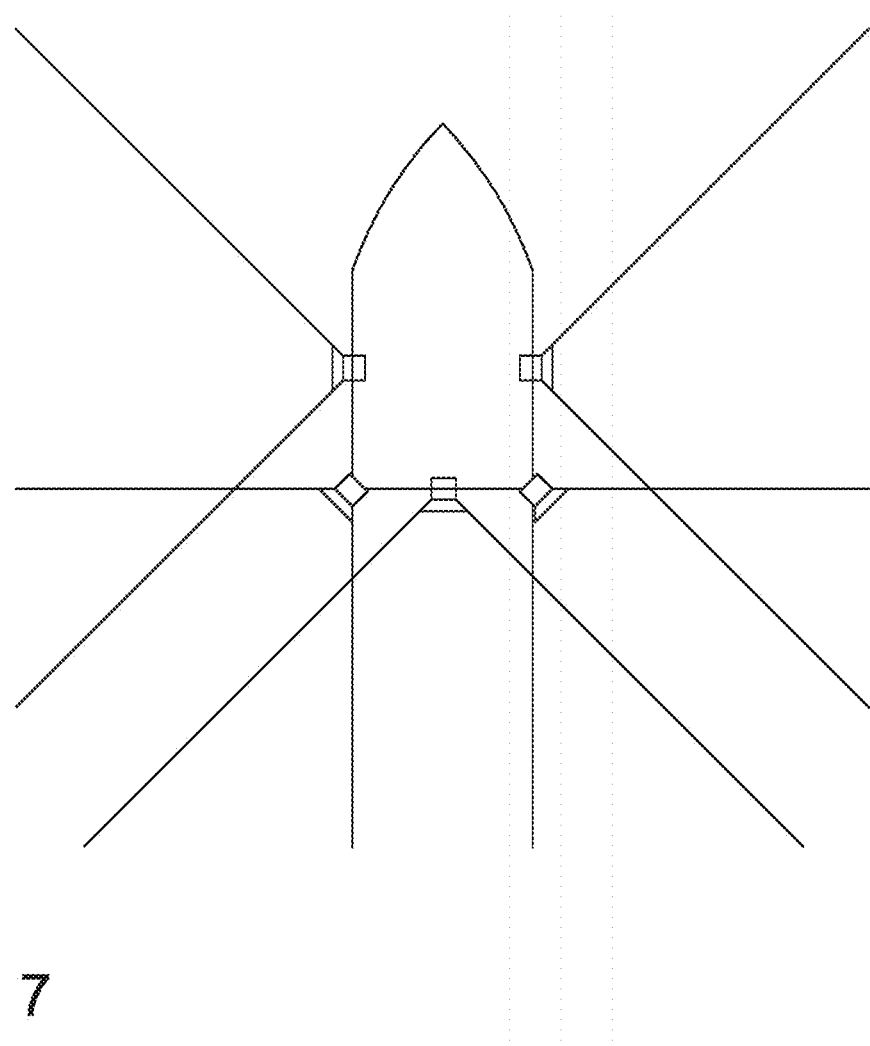
FIG. 7 shows a boat viewed from the top on which five sensors are mounted.

A possible application of apparatus 1 is the case of a parking assistance device or a mooring assistance device (cars, boats), formed by multiple sensors arranged around the vehicle. In the case of the figure, we call a sensor a single object composed of a LIDAR and a camera, rigidly constrained and calibrated to each other. For example, FIG. 7 shows a boat viewed from the top on which 5 sensors are mounted, having the Fields Of View (FOV) partially overlapping each other, and with such an overall aperture as to cover the side and rear of the vehicle. Such a device has the objective of showing the user the surroundings of the vehicle and the relative distances of objects in the vicinity, to assist in maneuvering and allow the vision of blind spots, such as behind, as well. All this must be done by producing a real-time image which is as faithful as possible, to allow a view of the framed environment which is understandable to the user. The stitching method suggested here is capable of fulfilling such a task.

Preferably, the size of the LUT is freely determined in the method for forming a panoramic image according to the invention. In particular, there is no two-way correspondence between the pixels in the panoramic image and the points acquired by the LIDAR, so the resolution of the image is not constrained by the resolution of the LIDAR. Each cell of the LUT contains information about which pixels of the individual images to combine in the stitching, for each possible object distance. Indeed, each optical ray corresponding to a pixel in the panoramic image is associated with a partition for each source image. Each segment of a partition corresponds to a single pixel in the corresponding source image; by knowing the depth of the object along an optical ray, it is possible to locate the exact corresponding pixels in the individual source images and thus obtain the pixel color in the panoramic image. Thus, the number of data saved in the LUT is optimal; this allows loading into memory a LUT with less data than the LUTs used in current methods for forming a panoramic image and allows for faster forming of the panoramic image. Furthermore, the implementation of the LUT according to the invention allows obtaining a better resolution of the panoramic image with respect to the current methods for forming a panoramic image.

The method for forming a panoramic image according to the invention does not require the use of a blending technique along the depth.

The invention claimed is:

1. A method for forming a panoramic image, said method comprising:
receiving a plurality of environment images from a corresponding plurality of cameras at a given time instant;
receiving data on the positions of points relative to the physical objects of said environment taken with said plurality of cameras by at least one depth sensor at said given time instant;
processing data deriving from at least one depth sensor to reconstruct the distance of all the objects contained inside said environment by a virtual camera, by obtaining a three-dimensional map of the positions of the points relative to the physical objects of said environment;
combining said three-dimensional map with the data contained in a lookup table preceding formed and memorized and wherein for each pixel of the plurality of pixels, which compose said panoramic image observed by said virtual camera, is allocated a cell of said lookup table, said cell storing data on the pixels of said plurality of images corresponding to the position of the single point of the three-dimensional map and data on the weights associated to said corresponding pixels of said plurality of images; and
linearly combining said pixels of said plurality of images as a function of the weight thereof by obtaining said panoramic image.

2. The method according to claim 1, characterized in that forming said lookup table comprises:
selecting a space reference system;
generating for each pixel of the panoramic image observed by said virtual camera, an optic ray outputting from and passing through said pixel, said pixel corresponding to the image of the point relative to the physical object that first intercepts said optic ray; and
allocating a cell of the lookup table for each pixel of the panoramic image, said cell storing data of each segment of the optic ray (r) projected on a single pixel of the image of each camera, said cell storing for each segment the weight to associate to said pixel of the image of each camera.

3. A method for forming a panoramic image, said method comprising:
receiving a plurality of environment images from a corresponding plurality of cameras at a given time instant;
receiving data on the positions of points relative to the physical objects of said environment taken with said plurality of cameras by at least one depth sensor at said given time instant;
processing data deriving from at least one depth sensor to reconstruct the distance of all the objects contained inside said environment by a virtual camera, by obtaining a three-dimensional map of the positions of the points relative to the physical objects of said environment;
combining said three-dimensional map with the data contained in a lookup table preceding formed and memorized and wherein for each pixel of the plurality of pixels, which compose said panoramic image observed by said virtual camera, is allocated a cell of said lookup table, said cell storing data on the pixels of said plurality of images corresponding to the position of the single point of the three-dimensional map and data on the weights associated to said corresponding pixels of said plurality of images; and
linearly combining said pixels of said plurality of images as a function of the weight thereof by obtaining said panoramic image,
wherein said data processing step for obtaining a three-dimensional map of the positions of the points relative to the physical objects of said environment comprises, in the case wherein said at least one depth sensor is a 2D sensor, the assumption that the detecting rays deriving from the depth sensors are contained in the same physical plan wherein the virtual camera finds, the physical objects of said environment which are observed by said virtual camera determine a surface on the space the interception of which with said physical plan defines a curve and the points detected from the depth sensors are a sampling of said curve, said processing step comprising for each single pixel of the panoramic image observed by said virtual camera:
interpolating the points which are interceptions of an optic ray outputting from a single pixel of the panoramic image observed by said virtual camera with a further curve stored in said physical plan and that approximates said curve;
immersing the further curve in a further surface that approximates said surface; and
locating along the optic ray the interception point of the optic ray outputting from the single pixel with said further surface.

4. The method according to claim 1, wherein said data processing step for obtaining a three-dimensional map of the positions of the points relative to the physical objects of said environment, in the case wherein said at least one depth sensor is a 3D sensor, comprises:
generating a surface in the space with the physical objects of said environment which are observed by the virtual camera by interpolating the points obtained by at least one 3D sensor; and
locating along the optic ray the interception point of the optic ray outputting from the single pixel with said surface.

5. An apparatus for forming a panoramic image comprising:
a plurality of cameras configured to receive a plurality of images of an environment at a given time instant;
at least one depth sensor configured to receive data on the positions of points relative to the physical objects of said environment taken with said plurality of cameras at said given time instant;
a data processing device comprising a microprocessor and a memory wherein a software is installed and is executed, said software being configured to execute the following functions:
processing data deriving from at least one depth sensor to reconstruct the distance of all the objects contained inside said environment by a virtual camera, by obtaining a three-dimensional map of the positions of the points relative to the physical objects of said environment;
combining said three-dimensional map with data contained in a lookup table preceding formed and memorized and wherein for each pixel of the plurality of pixels, which compose said panoramic image observed by said virtual camera, is allocated a cell of said lookup table, said cell storing data on the pixels of said plurality of images corresponding to the position of the single point of the three-dimensional map and data on the weights associated to said corresponding pixels of said plurality of images;
linearly combining said pixels of said plurality of images as a function of the weight thereof by obtaining said panoramic image; and
sending said obtained panoramic image to a display to display it.

6. The apparatus according to claim 5, wherein said at least one depth sensor is a at least one 2D LIDAR sensor.

7. An apparatus for forming a panoramic image comprising:
a plurality of cameras configured to receive a plurality of images of an environment at a given time instant;
at least one depth sensor configured to receive data on the positions of points relative to the physical objects of said environment taken with said plurality of cameras at said given time instant;
a data processing device comprising a microprocessor and a memory wherein a software is installed and is executed, said software being configured to execute the following functions:
processing data deriving from at least one depth sensor to reconstruct the distance of all the objects contained inside said environment by a virtual camera, by obtaining a three-dimensional map of the positions of the points relative to the physical objects of said environment;
combining said three-dimensional map with data contained in a lookup table preceding formed and memorized and wherein for each pixel of the plurality of pixels, which compose said panoramic image observed by said virtual camera, is allocated a cell of said lookup table, said cell storing data on the pixels of said plurality of images corresponding to the position of the single point of the three-dimensional map and data on the weights associated said corresponding pixels of said plurality of images;

linearly combining said pixels of said plurality of images as a function of the weight thereof by obtaining said panoramic image; and sending said obtained panoramic image to a display to display it, wherein said at least one depth sensor is a at least one 2D LIDAR sensor, and wherein said data processing function for obtaining a three-dimensional map of the positions of the points relative to the physical objects of said environment comprises the assumption that the detecting rays deriving from the depth sensors are contained in the same physical plan wherein the virtual camera finds, the physical objects of said environment which are observed by said virtual camera determine a surface on the space the interception of which with said physical plan defines a curve and the points detected from the depth sensors are a sampling of said curve, said processing step comprising for each single pixel of the panoramic image observed by said virtual camera:

interpolating the points which are interceptions of an optic ray outputting from a single pixel of the panoramic image observed by said virtual camera with a further curve stored in said physical plan and that approximates said curve;

immersing the further curve in a further surface that approximates said surface; and locating along the optic ray the interception point of the optic ray outputting from the single pixel with said further surface.

8. The apparatus according to claim 5, wherein said at least one depth sensor is a at least one 3D LIDAR sensor.

9. The apparatus according to claim 8, wherein said data processing function for obtaining a three-dimensional map of the positions of the points relative to the physical objects of said environment comprises:

generating a surface in the space with the physical objects of said environment which are observed by the virtual camera by interpolating the points obtained by at least one 3D sensor; and locating along the optic ray the interception point of the optic ray outputting from the single pixel with said surface.

10. The apparatus according to claim 5, wherein forming said lookup table comprises the functions of selecting a space reference system;

generating for each pixel of the panoramic image observed by said virtual camera, an optic ray outputting from and passing through said pixel, said pixel corresponding to the image of the point relative to the physical object that first intercepts said ray; and allocating a cell of the lookup table for each pixel of the panoramic image, said cell storing data of each segment of the ray projected on a single pixel of the image (li) of each camera, said cell storing for each segment the weight to associate to said pixel of the image of each camera.

* * * * *